United States Patent [19]

Cope

[11] Patent Number: 5,123,261
[45] Date of Patent: Jun. 23, 1992

[54] COOLING TUNNEL FOR FOOD PRODUCTS

[75] Inventor: Jonathan C. Cope, Madera, Calif.

[73] Assignee: Valley Grain Products, Inc., Madera, Calif.

[21] Appl. No.: 569,432

[22] Filed: Aug. 20, 1990

[51] Int. Cl.$^5$ ............... F25D 13/06; F25D 17/02; F25D 25/04

[52] U.S. Cl. .................. 62/374; 62/63; 62/375; 62/380

[58] Field of Search ............ 62/63, 341, 374, 380, 62/74, 375; 99/386, 517, 404; 34/216, 217, 163

[56] References Cited

U.S. PATENT DOCUMENTS

| | | | |
|---|---|---|---|
| 3,300,994 | 1/1967 | Bagge-Lund | 62/63 |
| 3,664,146 | 5/1972 | Butts | 62/63 |
| 3,708,995 | 1/1973 | Berg | 62/63 |
| 4,004,870 | 1/1977 | Guttinger et al. | 62/374 X |
| 4,186,797 | 2/1980 | Guttinger et al. | 62/380 X |
| 4,308,667 | 1/1982 | Roos et al. | 34/217 X |
| 4,380,191 | 4/1983 | Gallegos et al. | 99/404 |
| 4,481,782 | 11/1984 | Mukerjee | 62/63 |
| 4,534,183 | 8/1985 | Hashimoto et al. | 62/374 |
| 4,555,914 | 12/1985 | Kanto et al. | 62/341 |
| 4,627,244 | 12/1986 | Willhoft | 62/63 |
| 4,745,762 | 5/1988 | Taylor | 62/63 |
| 4,783,972 | 11/1988 | Tyree, Jr. et al. | 62/374 |
| 4,831,747 | 5/1989 | Roos et al. | 34/216 X |
| 4,966,003 | 10/1990 | Shima | 62/63 |

*Primary Examiner*—Henry A. Bennet
*Assistant Examiner*—Christopher B. Kilmer
*Attorney, Agent, or Firm*—Harris, Kern, Wallen & Tinsley

[57] ABSTRACT

A cooling tunnel for baked tortillas and the like, the tunnel having a housing defining a cooling space, an aperatured product conveyor for moving the product to be cooled through the cooling space, means for moving cooling gas over the tortillas in the cooling space, closed loop flexible hold down chains, supports for positioning the hold down chains in the cooling space for resting on the conveyor, and a drive for moving the hold down chains through the cooling space along with the conveyor with the tortillas between the hold down chains and the conveyor.

12 Claims, 2 Drawing Sheets

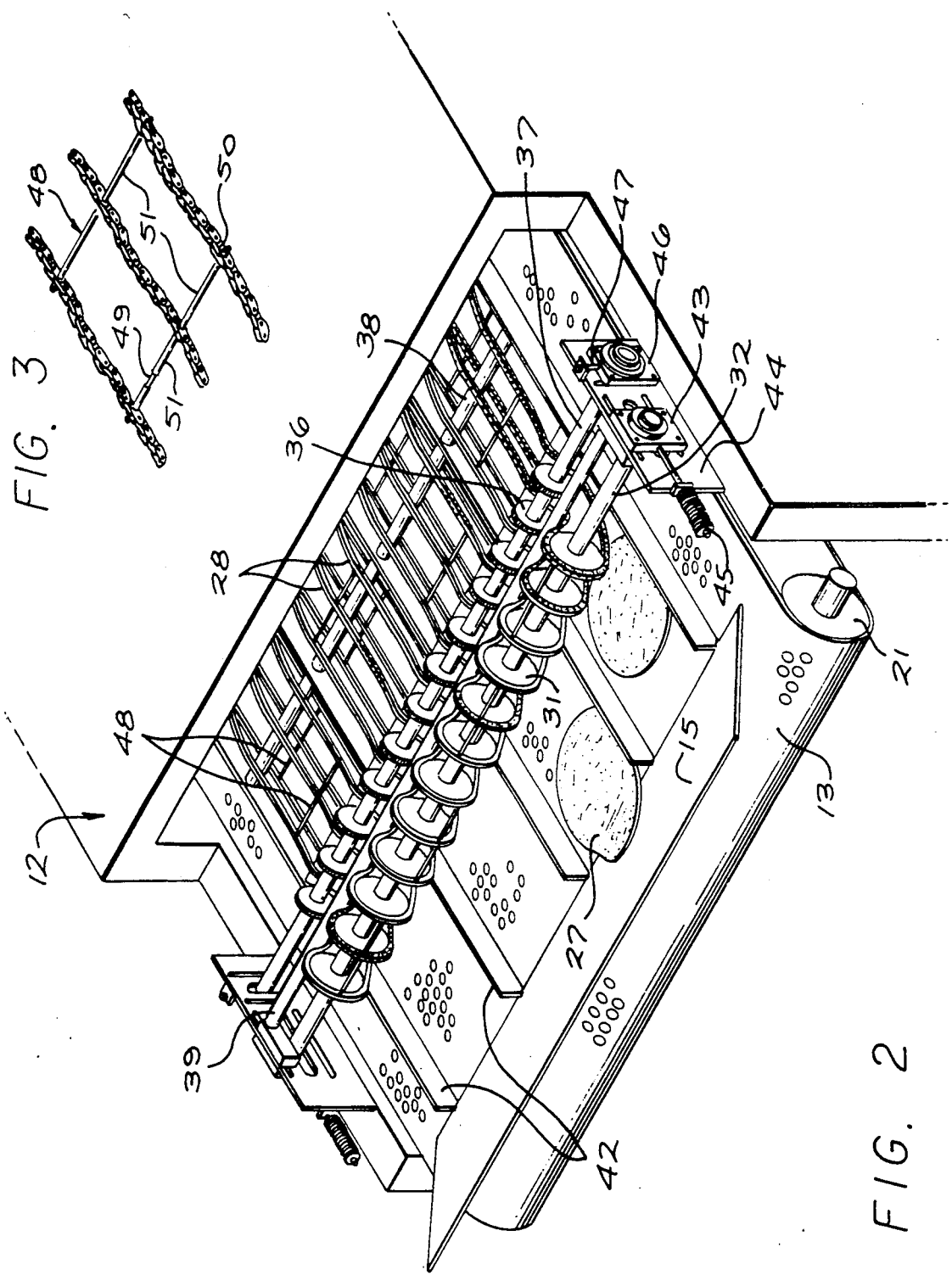

COOLING TUNNEL FOR FOOD PRODUCTS

BACKGROUND OF THE INVENTION

This invention relates to the manufacture of food products, and in particular to a new and improved cooling tunnel for use in high speed production of food products. The specific embodiment disclosed is used for the cooling of baked tortillas and the like prior to subsequent operations such as stacking or cutting and frying.

Cooling tunnels are widely used today and typically include a housing with a conveyor therein for moving the product through the tunnel. Blowers or fans provide for moving air and other gases, such as carbon dioxide, over the product, with the conveyor preferably being aperatured to permit flow of the gases through the conveyor. The carbon dioxide may be introduced by spraying liquid carbon dioxide into the cooling space to provide chilled air and carbon dioxide gas for cooling. Movement of the gases over the food product is enhanced by exhaust ducts and fans.

Problems are encountered in the operation of such cooling tunnels, particularly with high capacity tunnels providing for high speed movement of the product through the tunnel and for high velocity of cooling gas flow. In such tunnels, the fans within the tunnel are used to produce a storm of air or turbulence to achieve thorough mixing of the injected carbon dioxide and the incoming air. Fans are used in the exhaust ducts for drawing the gas mix past the product and out of the tunnel. Some food products, such as tortillas, have a relatively large surface area while being quite thin, and the high velocity movement in the tunnel tends to lift and move the product over the conveyor. This results in undesired overlapping of products, creasing or folding of product and other forms of damage to the product, such as product being blown upward and cut apart by the blades of the fans.

It is an object of the present invention to provide a new and improved cooling tunnel which can be operated at high product rate and high cooling rate without the risk of damage to the product being cooled.

It is a particular object of the invention to provide such a cooling tunnel incorporating closed loop flexible hold down devices which will engage and restrain the food product as it enters the cooling tunnel and maintain the product in position on the conveyor until it leaves the cooling tunnel. A specific object is to provide such a tunnel utilizing closed loop flexible and slack hold down chains which can be positioned on the food product which in turn is positioned on the conveyor, with the chains moving with product and the conveyor from the entrance to the exit of the tunnel.

These and other objects, advantages, features, and results more fully appear in the course of the following description.

SUMMARY OF THE INVENTION

In a specific embodiment of the new cooling tunnel, a housing defines a cooling space with an aperatured product conveyor moving the product to be cooled through the cooling space, and with one or more fans or blowers moving the cooling fluid in the cooling space past the product on the conveyor, with the product being maintained in position on the conveyor by closed loop flexible hold down devices which are supported in the tunnel for resting on the conveyor and are driven through the cooling space along with the conveyor with the product between the hold down devices and the conveyor. The preferred form for the hold down devices are closed loop flexible and slack chains.

BRIEF DESCRIPTION OF THE DRAWINGS

FIG. 2 is a perspective view of the inlet end of the cooling tunnel illustrating the operation of the flexible closed loop hold down devices; and FIG. 3 is an enlarged partial view of the chains of the tunnel of FIGS. 1 and 2.

DESCRIPTION OF THE PREFERRED EMBODIMENT

Figure 1:
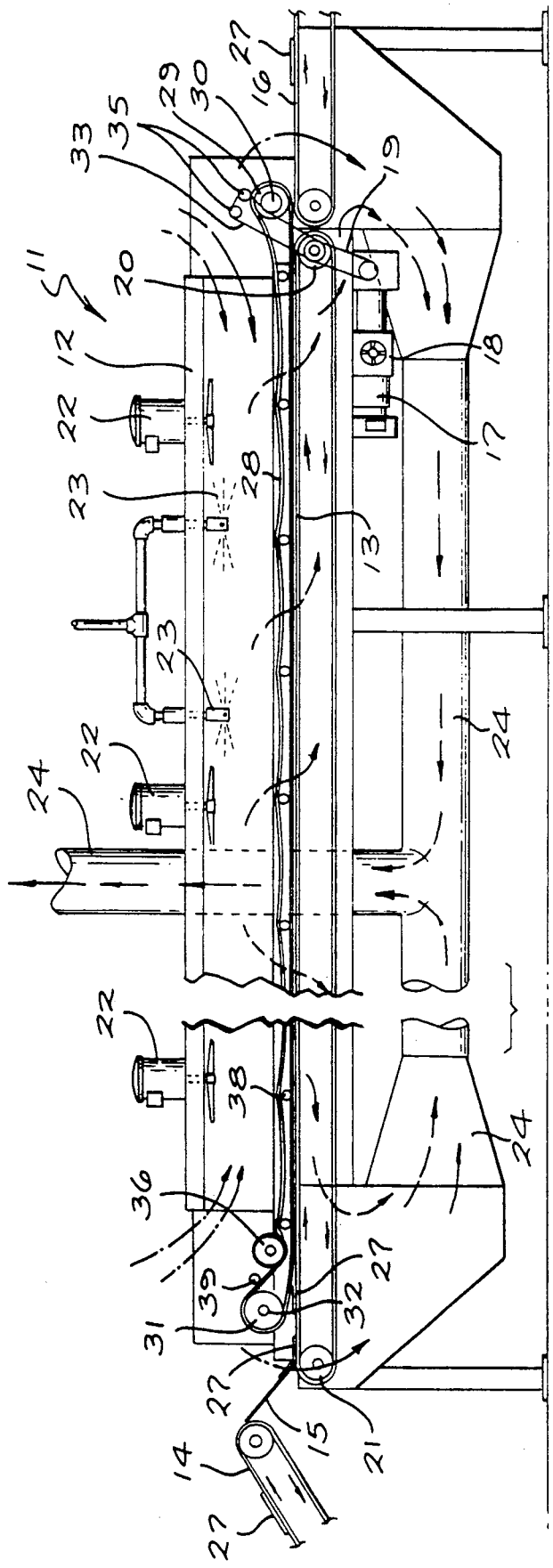
FIG. 1 is a side view of a cooling tunnel incorporating the presently preferred embodiment of the invention.

The cooling tunnel 11 in FIG. 1 includes a housing 12 which defines a cooling space, with an aperatured product conveyor 13 for moving the product to be cooled through the tunnel. The product is delivered to the product conveyor 13 by a feed conveyor 14 and a slide 15, and product is taken away from the product conveyor 13 by a take away conveyor 16.

The product conveyor is driven by a motor 17, gear box 18 and drive chain 19, with a driven roller 20 at one end of the conveyor 13 and an idler roller 21 at the opposite end.

Cooling fluid, typically a mixture of air and $CO_2$ gas, is moved through housing over the product conveyor. In the embodiment illustrated, motor driven fans 22 provide for mixing of $CO_2$ gas and air and for downward gas movement through the product conveyor, which preferably is an aperatured conveyor, typically a perforated plastic or cloth belt or a wire mesh belt. Air enters the housing at the open ends, and liquid $CO_2$ is sprayed into the cooling space via nozzles 23. The $CO_2$ - air mixture is removed from the cooling space via ducts 24 and an exhaust fan or blower (not shown). The cooling tunnel thus described is conventional in design and various forms of cooling tunnels may be used with the present invention.

The food product to be cooled, typically baked tortillas 27, is moved through the tunnel by the product conveyor 13. A mechanism is provided for maintaining the food product in position on the conveyor during transit of the tunnel. A closed loop flexible hold down device is utilized for this purpose, and the embodiment illustrated comprises a plurality of link chains 28.

The chains 28 are driven by a plurality of drive sprockets 29 on a drive shaft 30 at one end of the housing, with the chains running on idler sprockets 31 on an idler shaft 32 at the other end of the housing. The drive shaft 30 is driven by a drive chain 33 from the drive roller 20, over idlers 35 for moving the hold down chains in sychronism with the product conveyor.

Tension sprockets 36 are carried on a tension shaft 37 at one end of the chains for adjusting the tension in the endless loop chains. Preferably the chains are selected and the tension sprockets are adjusted so that the chains are slack so as to be able to rest on product of varying height. By way of example, sometimes during operation intended for single tortillas, the tortillas are inadvertently stacked in two's or three's, which tends to plug the lanes and jam the tunnel when the conveyor belt - hold down chain spacing is rigidly controlled. The slack chains should be adjusted to be able to rest on both the single and multiple tortillas without requiring any change in tension.

Spacer rollers 38 are positioned along the chain loops for maintaining spacing between the forward and return portions of the loops. A chain retainer roller 39 is positioned adjacent the idler sprockets 31 for maintaining the chains in position on the sprockets. This construction is shown in greater detail in FIG. 2.

Product defining lane guides 42 are carried in the housing directly above the product conveyor 13 for defining product lanes along the conveyor, five such guides being shown in FIG. 2 for defining four lanes. The idler shaft 32 rides in bearing blocks 43 which slide longitudinally in support plates 44 and are loaded by springs 45 to provide compensation for changes in chain length due to variations in tunnel temperature. The tension shaft 37 is carried in bearing blocks 46 which may be moved vertically in the plates 44 by adjustment screws 47 for adjusting chain tension. In the embodiment illustrated, three of the endless loop chains are provided for each of the lanes on the product conveyor, and rod and spacer assemblies 48 are provided for each group of three chains for maintaining lateral spacing between the chains. Typically rods 49 are positioned in openings in chain links 50, and spacer tubes 51 are carried on the rods. See FIG. 3.

While the presently preferred form for the closed loop flexible hold down device is a link chain which is slack, other forms which will lay loosely on the product may be used. The hold down device should maintain its position on the product because of the weight of the device rather than because of any tension in the device. Examples of other forms of hold down device are a bead chain, a cable with welded ends, and a round or narrow flat belt. Devices of this form are driven by pinch rollers or rollers with a flexible surface of rubber or the like. Other forms for the hold down device are an open mesh belt and a flat wire belt.

In any embodiment, care must be taken to insure that the aperatures in the conveyor and in the hold down device which permit gas flow therethrough past the product, are sufficiently large to avoid blockage by icing. There is often some moisture in the cooling tunnel and a tendency for ice to form. A minimum size for the aperatures is readily determined for any particular tunnel and product.

In operation, the tortillas or other food product to be cooled are deposited on the conveyor 13 via the conveyor 14 and slide 15, and the tortillas are moved through the tunnel by the product conveyor 13. The tortillas pass under the hold down chains 28 which are adjusted to gently lie on the tortillas. The tortillas now sandwiched between the product conveyor and the hold down chains are moved through the cooling space with the cooling gas storm flow thereover, which may be relatively high velocity for maximum cooling in a minimum time. The sandwiching effect of the hold down chains holds the tortillas in position, preventing flopping around, maintaining spacing on the conveyor and eliminating the tendency to lift or to fold over. The hold down chains above and the aperatured conveyor below provide maximum exposure of the tortilla area for cooling, as the gas flows down over the tortillas and through the conveyor. As the tortillas exit the tunnel, the hold down chains are lifted by the sprockets 29 and the tortillas are free for transfer to the take away conveyor 16.

While three hold down chains with sprockets are shown for each lane, other arrangements may be used. By way of example, one or two or four chains may be used, depending on the lane width and product size. At the drive roller, only one or two chains may be driven, with the other chain or chains on an idler roller. At the idler roller and/or tension roller, smooth rollers or pulleys may be used in lieu of toothed sprockets.

I claim:

1. In a cooling tunnel for food products, the tunnel having a housing defining a cooling space, an apertured product conveyor for moving the product to be cooled through said cooling space, and means for moving a cooling fluid in said cooling space past the product, the improvement comprising in combination:
   an apertured closed loop flexible hold down means;
   support means for positioning said hold down means in said cooling space for resting on said conveyor with said conveyor and hold down means providing for movement of said cooling fluid therethrough; and
   drive means for moving said hold down means through said cooling space along with said conveyor with the product between said hold down means and said conveyor.

2. A cooling tunnel as defined in claim 1 wherein said hold down means includes a closed loop flexible chain resting on the product.

3. In a cooling tunnel for food products, the tunnel having a housing defining a cooling space, and apertured product conveyor for moving the product to be cooled through said cooling space, and means for moving a cooling fluid in said cooling space past the product, the improvement comprising in combination:
   closed loop flexible hold down means;
   support means for positioning said hold down means in said cooling space for resting on said conveyor; and
   drive means for moving said hold down means through said cooling space along with said conveyor with the product between said hold down means and said conveyor;
   said hold down means including a plurality of closed loop flexible chains positioned parallel with each other transversely across said conveyor.

4. A cooling tunnel as defined in claim 1 wherein said hold down means is slack and resting on the product.

5. A cooling tunnel as defined in claim 1 wherein said drive means includes means for moving said conveyor through said cooling space in synchronism with said hold down means.

6. A cooling tunnel for food products, the tunnel having a housing defining a cooling space, an apertured product conveyor for moving the product to be cooled through said cooling space, and means for moving cooling gas over the tortillas in said cooling space, the improvement comprising in combination:
   an apertured closed loop flexible slack hold down means;
   support means for positioning said hold down means in said cooling space for resting said hold down means on said conveyor; and
   drive means for moving said hold down means through said cooling space along with said conveyor with the tortillas between said hold down means and said conveyor.

7. A cooling tunnel for food products, the tunnel having a housing defining a cooling space, an apertured product conveyor for moving the product to be cooled through said cooling space, and means for moving cooling gas over the tortillas in said cooling space, the improvement comprising in combination:

closed loop flexible slack hold down means;

support means for positioning said hold down means in said cooling space for resting on said conveyor; and drive means for moving said hold down means through said cooling space along with said conveyor with the tortillas between said hold down means and said conveyor;

said hold down means including a plurality of closed loop flexible chains positioned parallel with each other transversely across said conveyor.

8. A cooling tunnel as define din claim 7 including means defining a plurality of product lanes through said tunnel, and a set of said chains for each of said lanes.

9. A cooling tunnel as defined in claim 7 wherein said drive means includes means for moving said conveyor through said cooling space in synchronism with said hold down means.

10. A cooling tunnel as defined in claim 9 wherein said drive means includes a drive shaft with drive sprockets thereon for said chains and positioned at one end of said tunnel, and an idler shaft with idler roll means thereon for said chains and positioned at the other end of said tunnel, with each chain passing around corresponding drive sprocket and idler roll means, and a tension shaft with tension roll means thereon for said chains and adjustably positioned for engagement with corresponding chains for controlling tension in said chains.

11. A cooling tunnel as defined in claim 10 including means defining a plurality of product lanes across said conveyor, with a group of said chains positioned in each of said lanes, and with a plurality of spacers for each of said groups of chains positioned transversely between adjacent chains of the group along the loops.

12. A cooling tunnel as defined in claim 10 including a chain retainer roller positioned transversely of said chains between said tension shaft and said idler shaft for engaging said chains between said tension and idler roll means, and a plurality of chain spacer rollers positioned transversely of said chains and spaced along said tunnel between the forward and return portions of the chain loops.

* * * * *